(12) United States Patent
Herberger et al.

(10) Patent No.: US 7,519,832 B2
(45) Date of Patent: Apr. 14, 2009

(54) SYSTEM AND METHOD OF CREATING SECURE ENCRYPTED DIGITAL MEDIA FILES FROM A BASE MEDIA WORK FOR ADDITIONAL DEFINED PROCESSING

(75) Inventors: Tilman Herberger, Dresden (DE); Titus Tost, Dresden (DE)

(73) Assignee: Magix AG (DE)

( * ) Notice: Subject to any disclaimer, the term of this patent is extended or adjusted under 35 U.S.C. 154(b) by 851 days.

(21) Appl. No.: 10/998,862

(22) Filed: Nov. 29, 2004

(65) Prior Publication Data

US 2006/0129842 A1 Jun. 15, 2006

(51) Int. Cl.
*G06F 12/14* (2006.01)
(52) U.S. Cl. ...................................... 713/189
(58) Field of Classification Search .................. 713/189
See application file for complete search history.

(56) References Cited

U.S. PATENT DOCUMENTS

| | | | |
|---|---|---|---|
| 4,745,836 A | 5/1988 | Dannenberg | |
| 5,065,429 A | 11/1991 | Lang | |
| 5,191,611 A | 3/1993 | Lang | |
| 5,286,907 A | 2/1994 | Okamura et al. | |
| 5,491,751 A | 2/1996 | Paulson et al. | |
| 5,563,947 A | 10/1996 | Kikinis | |
| 5,596,639 A | 1/1997 | Kikinis | |
| 6,591,367 B1 | 7/2003 | Kobata et al. | |
| 6,684,199 B1 | 1/2004 | Stebbings | |
| 7,024,466 B2 * | 4/2006 | Outten et al. | 709/219 |
| 2001/0032312 A1 | 10/2001 | Runje et al. | |
| 2002/0004785 A1 | 1/2002 | Schull | |
| 2002/0004903 A1 | 1/2002 | Kamperman et al. | |
| 2002/0056048 A1 | 5/2002 | Sako et al. | |
| 2002/0083346 A1 | 6/2002 | Rowlands | |
| 2002/0094083 A1 | 7/2002 | Bhattacharya et al. | |
| 2002/0138741 A1 | 9/2002 | Koch | |
| 2002/0165828 A1 * | 11/2002 | Sakamoto | 705/64 |
| 2003/0046568 A1 | 3/2003 | Riddick et al. | |
| 2003/0142827 A1 | 7/2003 | Ohwada et al. | |
| 2003/0149885 A1 | 8/2003 | Fang et al. | |
| 2004/0133518 A1 * | 7/2004 | Dryall | 705/50 |

* cited by examiner

*Primary Examiner*—Kambiz Zand
*Assistant Examiner*—Aubrey H Wyszynski
(74) *Attorney, Agent, or Firm*—Fellers, Snider, Blankenship, Bailey & Tippens, P.C.; Terry L. Watt (57) ABSTRACT

There is provided herein a system and method for creating and storing encrypted digital media files that are compatible with a base audio work and that provide the artist some degree of control over how the encrypted files are used. The encrypted files will preferably be stored on an audio CD along with conventional/unencrypted audio in such a fashion that the user will be able to immediately play the audio material. Preferably, the encrypted information will include auxiliary audio information such as additional music tracks, remixes of some of the songs, and other materials that allow a user to create remixes. Additionally, the creator of the encrypted material will be able to specify rules that define how the user can use the encrypted information. Preferably, the encrypted information will be created by the artist during the creation of the CD's unprotected audio content.

22 Claims, 7 Drawing Sheets

SYSTEM AND METHOD OF CREATING SECURE ENCRYPTED DIGITAL MEDIA FILES FROM A BASE MEDIA WORK FOR ADDITIONAL DEFINED PROCESSING

FIELD OF THE INVENTION

The present invention relates generally to the field of editing and creating digital music. More particularly, but not by way of limitation, the present invention relates to a process which encrypts sections of a musical work during its creation, wherein the encrypted sections are embedded with specific rule settings that define how the encrypted sections may be used by end users.

BACKGROUND OF THE INVENTION

It is well known that over the last twenty years the music industry has seen a steady decline in the worldwide sales of pre-recorded music products. This decrease in sales had its genesis in the early 1980s when companies like Sony, CBS/Sony, Philips and Polygram jointly developed the first CD system. Prior to this, the music industry primarily sold its recordings on LPs and 45 RPM records which—due to their analogue nature—tended to deteriorate over time and did not provide the sound quality that many listeners desired. However, even before the development of the audio CD and CD players in 1982, music industry sales were already in decline. The music industry blamed its then-slumping sales on the development and widespread availability of cassette tapes: recall the music industry accusation that "Home taping is killing music". However, other factors also contributed to this decline including the movement away from disco-style music in the 70s and the increasing availability of video games, video games tending to compete with music for the consumer's entertainment dollar.

However, during the years immediately following the introduction of the CD, music sales again began to climb as consumers recognized the numerous advantages of this medium, not the least of which was the amazing quality of digital recordings. Sales of new and older albums (as people upgraded their LPs to higher quality CDs) provided the industry with a steadily increasing market for its product. In addition, the birth of MTV spurred interest in a new music trend—the now so-called 80s synthie pop style—that lead to substantial new record sales. In summary, the introduction of a new high-quality technology and the advent of new music styles were among the factors that motivated consumers to begin buying music once again.

The success of the CD as a recording medium contributed to the continuing rise in music sales until the mid 90s, at which time sales peaked and then began to fall. According to industry studies, sales continued to decline from that time up to today, with the problem tending to worsen in recent years. Although this slump likely has many contributing factors, one often cited reason is the popularization of the MP3 coding technique which enables users to reduce digital audio to a fraction of its uncompressed size. Additionally, the growth of the Internet as a mechanism for distributing digital works via, e.g., file sharing has also played some role in the observed decrease in music sales.

There are several additional factors that have contributed—and still contribute to —the aforementioned sales decline. For example, other sources of electronic entertainment compete for consumer's time and their music industry dollars including DVDs, video games, cable TV and the Internet. Additionally, many older consumers are satisfied listening to the "oldies" that they repurchased on audio CDs and are not generally motivated to buy the latest "hit-song" by superstar "X". Also younger costumers may not be as likely to show loyalty to a single artist as might have been the case in the past and, as a consequence, they may not automatically buy each album by the same artist over the years.

In summary, today, as in the past, the music industry points directly and almost entirely at new technology and file sharing as the causes of its woes, which is true to a certain extent, but ignores many important contributing factors.

In an effort to combat the pirating of audio CDs the music industry has implemented a two-pronged approach. The first prong has been legal prosecution of sites that facilitate the distribution of copyright music over the Internet coupled with highly visible legal prosecution of selected end users who participate in such distribution. The second prong is aimed at cutting off pirated music at its source, making it difficult or impossible to create MP3 files by creating audio CDs that cannot be read by a common PC. To this end a variety of different copy protection schemes have been developed which then were embedded on the audio CDs and were distributed with the releases.

Unfortunately, this two-pronged approach had only limited successes. The litigation campaign has had some success (e.g. Napster was forced to close) but lawsuits against end users created a good deal of ill will in the consumer community toward the industry. On the other hand, adding copy protection to audio CDs has given rise to heated opposition by several consumer organizations and by certain of the music industry publishers. Apparently the addition of copy protection to a CD causes it to no longer comply with the audio CD standard as defined by Philips. Further, consumers have reported many instances of common CD players unable to play protected audio CDs. As a consequence, in some instances the music industry has been forced to replace copy protected audio CDs with unprotected versions of same.

Of course, the music industry would welcome a technology change similar to that experienced with the introduction of the CD, a change that would have customers reaching for their wallets in order to upgrade their existing music libraries. However, the newest consumer audio technologies, e.g., SACD and the DVD-Audio format, although providing the consumer with higher quality sound, have had not generated any enthusiasm in the consumer market. One reason for this is that the average consumer cannot really appreciate the improvement in quality over conventional CDs, which was not the case when CDs were compared with music stored on records or tapes. As a consequence, consumers have not been ready to buy the same music for a third time.

Thus, in the final analysis, none of the initiatives discussed previously seems to have made any real difference in the buying habits of consumers and, instead, have hurt the reputation of the music industry in the eyes of the public.

Thus what is needed is a method that provides the music industry with a method of increasing its revenue from music sales that does not alienate consumers. It further must offer music tracks that can be read without problem on conventional CD players and PCs but that still encourages consumers to upgrade their existing music libraries. Still further it must provide a way for music companies and artists to control distribution of their works.

Heretofore, as is well known in the media editing industry, there has been a need for an invention to address and solve the above-described problems. Accordingly it should now be recognized, as was recognized by the present inventors, that there exists, and has existed for some time, a very real need for a system and method that would address and solve the above-described problems.

Before proceeding to a description of the present invention, however, it should be noted and remembered that the description of the invention which follows, together with the accompanying drawings, should not be construed as limiting the invention to the examples (or preferred embodiments) shown and described. This is so because those skilled in the art to which the invention pertains will be able to devise other forms of the invention within the ambit of the appended claims.

SUMMARY OF THE INVENTION

There is provided herein a system and method for automatically creating secure encrypted digital media files from a base audio work. These encrypted files will preferably be stored as auxiliary files on a conventional audio CD-. The user will be able to immediately play the audio portion of the CD on any conventional player. -Preferably, the sorts of information that will be encrypted will be auxiliary audio information such as additional music tracks, remixes of some of the songs, and additional individual tracks that will allow a user to create his or her own remixed works. Preferably, the encrypted digital information will be created by the artist during the creation of the CD's unprotected audio content.

Additionally, and as another preferred aspect of the instant invention, the artist and/or music publisher will be able to specify a set of rules that define how the user will be able to interact with or use the auxiliary audio information, whether encrypted or not. These rules will preferably be accessible by and usable by a replay tool that is designed to allow a user to read and interact with the auxiliary information.

According to a preferred embodiment, one aspect of the instant invention will be distributed as an add-on to a pre-existing full-function digital music editing program. That being said, those of ordinary skill in the art will recognize that it certainly could be implemented as a stand-alone module as well. The inventive module will preferably be made available as an upgrade for users of the base music creation/editing program. In the preferred arrangement, the process of the instant invention will be engaged after the musical work or works have been created. Of course, it is certainly possible that the instant invention would be incorporated directly into and made a part of the music creation process. Note that terms "music" and "musical work" should be interpreted as broadly as possible and should refer to an audio work with one or more defined tracks, whether such tracks contain instruments, voices, sound effects, etc. Note also that the instant method is suitable for use with conventional digitally recorded music, with music stored according to the MIDI standard, etc. Thus, for purposes of the instant invention, "digital music" should be understood to include any of the foregoing.

Turning to a preferred embodiment of the instant invention, the methods taught herein are designed to enhance the functionality of an underlying base music creation program. Note that added functionality is not specifically directed to the music creation in general but rather to another aspect—the next phase after the music creation—music distribution. It is anticipated that the instant invention will be most suitable for use by professional musicians and recording studios, although certainly hobbyists might also find the instant invention useful.

As a preferred first step, the artist will acquire an encryption key, i.e., an "artist key" hereinafter. The artist key will typically be provided by a third party, preferably the inventors of the instant invention. The artist key is, as the name suggests, preferably unique to each artist and might be distributed in a variety of different forms. For example, it might be embedded within a hardware device that is attached to the user's computer, e.g., like a conventional dongle. Alternatively, such a key might be written to a CD, transmitted via the Internet, or even printed and mailed. That being said, in the preferred embodiment the key that is contemplated for use with the instant invention will be a cryptographic key of the sort that would typically be provided to the artist in computer readable form.

The artist key is preferably implemented as a public/private key system, wherein both keys are needed for encryption. The public key may then be distributed to end users for use in decoding the encrypted portions of their previously purchased musical works. Note, however, that depending on the embodiment more than simple decoding could be involved. As is described hereinafter, the public key may also include information that specifies the uses to which the decoded material may be put (i.e., a rules set). Note further that, unlike common public key encryption, here the public key is preferably used to decode information in an operation comparable to that of verifying a digital signature. This simple modification of conventional two key systems can readily be implemented by one of ordinary skill in the art.

As a next preferred step the artist will choose sections of the musical work or other auxiliary audio source materials that are preferably to be distributed as encrypted digital media files and, further, determine the list of uses of the encoded material that will be allowed. Note that the permitted uses could be specified for entire songs or portions thereof, entire tracks or portions thereof, individual loops within a sound pool, etc. The artist could further restrict the user to using the later-unencrypted audio source materials within the context of the purchased work or, alternatively, the artist could give the user free reign to use this material for any purpose and in any context, including mixing it with sound from other sources. In still another variation, the artist could restrict the consumer to only use the sound data with other sound sources (e.g., songs, tracks, loops, etc.) composed by the same artist. The list of uses to which the auxiliary source materials might be put will be referred to hereinafter as its rule set.

In another preferred arrangement, the artist will be able to control how the encrypted information will be distributed after decoding, e.g., via the Internet, via one ore more types of storage media, etc. Additionally the artist will preferably be able to control whether the consumer will be able to store created mixes out of the shared portion.

In still another preferred arrangement, the artist will be able to control which (if any) of the decoded auxiliary audio materials can be edited. The sorts of edits that are contemplated would include, by way of example only, edits such as cutting/deleting portions of the work therefrom, pasting other material into it, changing the work's pitch or tempo, filtering it, etc. Finally, the artist will preferably be able to define which components of the auxiliary sound materials can be exported to other applications. For example, the artist will preferably be able to completely disable any sort of export, in which case the replay tool discussed hereinafter will only be able to replay (but not store) the remixed work. Alternatively, the artist could allow the consumer to freely export the previously-encrypted material in any format including, without limitation, export to an audio CD, to a WAV or MP3 or other file, etc. Of course, the artist could also choose to only allow export into secure formats that utilize DRM (i.e., digital rights management) techniques.

Thus, in the preferred arrangement, the artist will create a list of the privileges that should be associated with the auxiliary audio works that are to be encrypted.

As a next preferred step the instant invention encrypts the auxiliary musical elements that have been selected by the artist, with the encrypted versions of the selected musical elements preferably being combined into a single sound pool.

Although many encryption schemes might be used, the instant inventors prefer that one of the familiar public key systems be used (e.g., AES, Blowfish, CAST, DES, RSA and Cobra 128, etc.). Preferably, the artist's public key will be encoded into the encrypted digital media files. This is preferably done so that the encrypted sound pool will be recognizable by the replay/edit tool that will be written to access it.

After the sound pool has been encrypted, the artist will next preferably determine the use limitations on these data. Preferably the usage will apply uniformly to all of the material that has been stored in the sound pool, although it is certainly possible that each data item therein might be treated differently. Depending on the particular uses that are allowed, a customized software tool (the "editing tool" hereinafter) will preferably be prepared, the software being primarily a music editing software program with potentially reduced functionality depending on the sorts of edits that are permitted by the artist. The editing tool is basically an arranger for sound clips, loops, etc., wherein the consumer can create his or her own remixes of the encrypted available content. Those of ordinary skill in the art will recognize that general purpose loop editing/music composition programs are well known, but the encryption-related features discussed above are not.

The functionality offered by the editing tool will preferably be limited to the sorts of edits authorized by the artist and is designed primarily to allow the user to create remixes of the materials provided. Additionally, and in another preferred arrangement, the consumer will be able to upgrade the functionality of the supplied software tool to include the full functionality of the music editing software program. This will preferably be accomplished by providing a link that has been embedded in the editing tool that leads the user to a web site that allows the user to unlock the full features of the editing program, preferably by paying an additional fee. Of course, this is only one of many possible ways that a user could be allowed to upgrade the program's functionality.

Finally, the encrypted sound pool and the music editing program are preferably written to the audio CD for distribution as part of the sale of the audio recording or, alternatively, these bonus materials might be distributed over the Internet directly to interested end users. It should be noted that the instant invention provides the consumer with an option of purchasing a favourite song and also using his or her personal computer to create remixes of that song with components that have been selected by the original artist and that are compatible with that favourite song.

Thus, it should be clear that an approach such as this would provide benefit to both the consumer and the artist and would additionally give the consumer an incentive to purchase audio CDs rather than pirating them. Further, this approach gives the artist control over the uses of at least the supplementary materials. Still further, the instant invention permits the consumer/fan to work with some of the same musical elements as the artist himself, thereby allowing the public to participate to a certain extent in the creative process of the artist.

Broadly speaking the instant approach has several advantages over prior art methods. First, the instant invention results in a product that may be played as a music CD on any conventional audio CD player or PC and does not contain any sort of intrusive copy protection. Second, it encourages users to buy the original CD because they not only get their favourite music but they also acquire the option of getting a look at the music creation process by working with the additional content (assuming, of course, that the artist has included, for example, remix tracks within the auxiliary materials). Third, the instant invention has the potential to convince consumers to upgrade their existing CD recordings by offering bonus material not on the originals. Finally, the decrypted material is preferably designed to be used in connection with the buyer's existing computer and, depending on the designs of the artist, will allow the user to participate in the creative process by creating new remixes of the musical works contained thereon.

The foregoing has outlined in broad terms the more important features of the invention disclosed herein so that the detailed description that follows may be more clearly understood, and so that the contribution of the instant inventors to the art may be better appreciated. The instant invention is not limited in its application to the details of the construction and to the arrangements of the components set forth in the following description or illustrated in the drawings. Rather the invention is capable of other embodiments and of being practiced and carried out in various other ways not specifically enumerated herein. Additionally, the disclosure that follows is intended to apply to all alternatives, modifications and equivalents as may be included within the spirit and the scope of the invention as defined by the appended claims. Further, it should be understood that the phraseology and terminology employed herein are for the purpose of description and should not be regarded as limiting, unless the specification specifically so limits the invention. Further objects, features and advantages of the present invention will be apparent upon examining the accompanying drawings and upon reading the following description of the preferred embodiments.

BRIEF DESCRIPTION OF THE DRAWINGS

Other objects and advantages of the invention will become apparent upon reading the following detailed description and upon reference to the drawings in which.

DESCRIPTION OF THE PREFERRED EMBODIMENTS

Referring now to the drawings, wherein like reference numerals indicate the same parts throughout the several views, there is provided a preferred system and method for creating secure encrypted digital media files that are compatible with a base musical work and wherein the usage of the musical materials so created is controlled by their creator.

By way of general explanation and in accord with the preferred embodiment, it is to be understood that when the phrase "creating secure encrypted digital media files" is used herein that usage will be interpreted as meaning creating an encrypted sound pool that is compatible with a selected or base musical work and that further preferably includes a listing of acceptable uses for such sound pool components, the circumstances under which the secure data can be decoded being controlled by the creator of the pool, presumably the artist. Generally speaking the artist/creator of the encrypted sound pool will have created same with the understanding that the consumer will be able to utilize this information only under the circumstances described hereinafter.

For purposes of the instant invention it should be understood that the methods disclosed herein enable an artist/creator of media works to define sections, elements or materials out of the media work that can be made available to a third party. Additionally the instant invention enables the creator to define selection and/or usage rules for the encrypted material.

Figure 1:
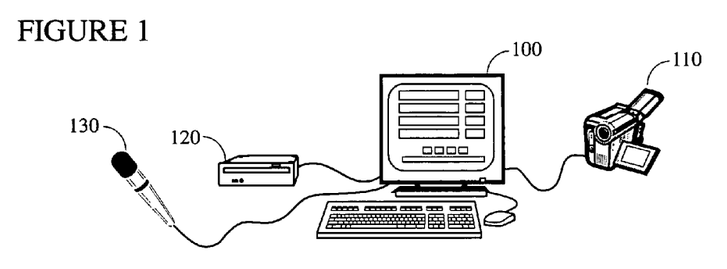
FIG. 1 illustrates a preferred environment for the instant invention.

As is generally indicated in FIG. 1, at least a portion of the instant invention will be implemented in form of software running on a user's computer 100. Such a computer will have some amount of program memory and hard disk storage (whether internal or accessible via a network) as is conventionally utilized by such units.

Additionally it is possible that an external digital or video camera 110 of some sort will be utilized with—and will preferably be connectible to—the computer so that video and/or graphic information can be transferred to and from the computer (FIG. 1). Preferably the camera 110 will be a digital video camera, although that is not a requirement, as it is contemplated that the user might wish to utilize still images from a digital still camera in the creation of his or her multimedia work. Further given the modern trend toward incorporation of cameras into other electronic components (e.g. in handheld computers, telephones, laptops, etc.) those of ordinary skill in the art will recognize that the camera might be integrated into the computer or some other electronic device and, thus, might not be a traditional single-purposes video or still camera. Although the camera will preferably be digital in nature, any sort of camera might be used, provided that the proper interface between it and the computer is utilized. Additionally a microphone 130 might be utilized so that the user can, for example, add voice-over narration to a multimedia work and a CD or DVD burner 120 could be useful for storing in-progress or completed works.

Figure 2:
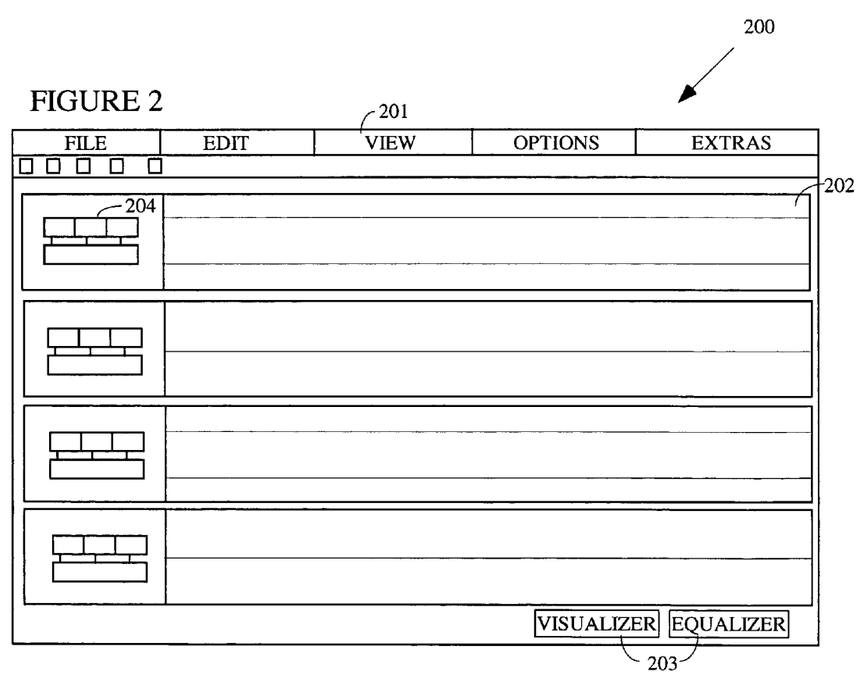
FIG. 2 illustrates the graphical user interface of the professional tool of the instant invention in a first phase.

According to FIG. 2, in a preferred embodiment a user of the instant multimedia editing system will be presented with a computer screen display 200 which contains various functional elements of the sort indicated in this figure. For example, and as is typical for such editing programs, menu sections 201 will be provided to allow a user to interact with the underlying program and these selections 201 would typically provide for options that allow the user to browse and add new multimedia material into the multimedia work. Additionally the user will preferably be initially provided with a plurality of selectable on-screen tracks 202, each of which is intended to contain digital music and/or loops therein. Four such tracks have been displayed in FIG. 2 for purposes of illustration only. Preferably, individual track controls 204 will be provided that might let a user, for example, select an individual track for filtering, apply an effect to that track (e.g., reverb or flanging), etc. As is customary in music editing programs, the user will be expected to specify the music data that is to be stored therein. It is also preferred that standard music editing functions (e.g. cut, paste, apply effects, filter, etc.) be provided.

Additional functionality is preferably provided via on-screen control buttons 203, which provide a way for the user to initiate some of the more advanced functions of the multimedia editing system. These functions will be discussed in more detail below.

Figure 3:
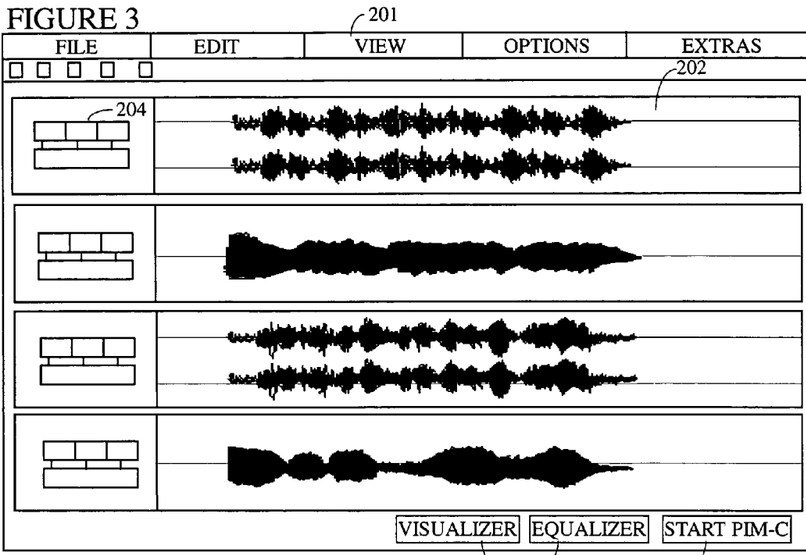
FIG. 3 illustrates the graphical user interface of the professional tool of the instant invention at a second phase.

Turning next to FIG. 3, this figure illustrates how the screen of FIG. 2 might appear to the artist/creator after the empty tracks have been populated with musical content. Additionally this figure illustrates another preferred aspect of the instant invention in which another control button 301 has been added to the graphical user interface. This modification of the user interface is preferably carried out automatically after the artist has obtained the right to use the encryption option of the instant program.

Figure 4:
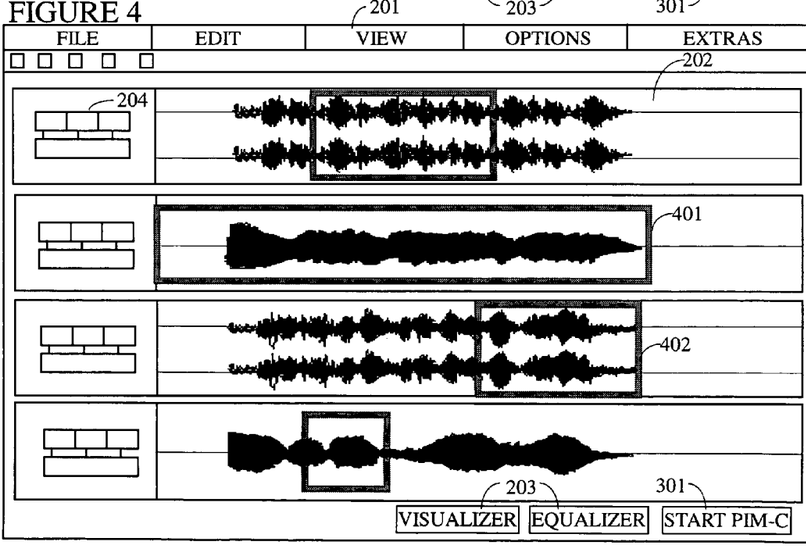
FIG. 4 depicts the graphical user interface of the professional tool at a third phase of the instant invention.

FIG. 4 illustrates an additional preferred step in the process of creating the encrypted sound pool and a corresponding preferred visualization of the graphical user interface. After the artist/composer has selected the appropriate button 301, he or she will be able to select the multimedia elements that are to be included in the encrypted sound pool. As is illustrated in FIG. 4, the artist user will preferably be able to select entire tracks for inclusion in the sound pool (e.g., selection box 401) as well as portions of a track (selection box 402), with the selection process continuing until the user is satisfied.

Figure 5:
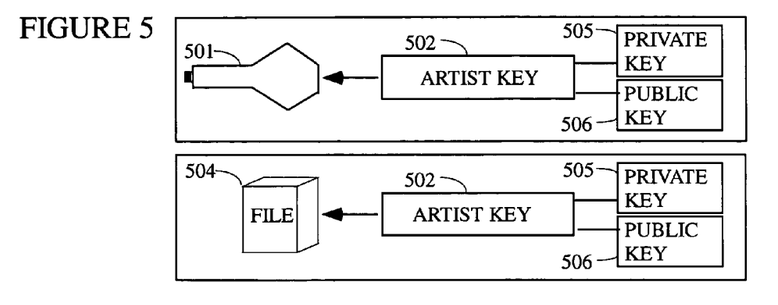
FIG. 5 depicts some possible variations of the artist key.

As will be explained in greater detail hereinafter, in one preferred embodiment the artist/creator will utilize encryption to ensure that the auxiliary audio items can only be used according to the desires of the artist. Preferably, such encryption will be performed via a two-key system that, for purposes of the instant disclosure, will be assumed to consist of a private key and a public key. FIG. 5 illustrates two preferred embodiments of the instant invention: one where the artist key is incorporated into a piece of hardware and another where it is distributed in software. In a first preferred embodiment, the encryption key 502 will be distributed via a hardware key or dongle 501 as that term is known to those of ordinary skill in the art. Such a hardware key would be connected to the artist's computer via, for example, a USB, serial or a parallel port. Embedded within the hardware key device 501 is preferably the numerical artist key 502 which consists of a private key 505 and a public key 506, assuming that a public key encryption scheme (preferably modified as described herein) is used. Additionally the private 505 and public 506 keys might also be distributed within a piece of software form or separately in digital form 504, wherein the key is preferably the same as for the hardware version of the key 501. Those of ordinary skill in the art will recognize how such could readily be done.

Figure 6:
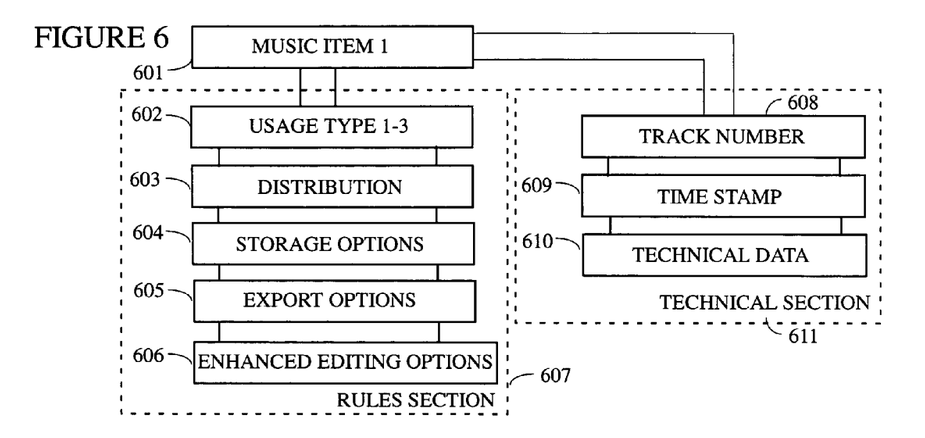
FIG. 6 contains a description of the internal data structure of a selected material.

Turning next to FIG. 6, this figure illustrates a preferred internal data structure 601 of an encrypted auxiliary music item. As can be seen, the data structure associated with an encrypted passage is preferably divided into two sections: a technical section 611 and a rules section 607. The technical section 611 would typically contain data that is needed for the editing software program to quickly locate and access the corresponding stored music including, for example, a track number 608 that specifies where on disk the music is stored, a time stamp 609 that contains various time parameters related to the selection (e.g., a start and end time might be embedded into the time stamp). Additionally the technical section 611 preferably includes information 610 related to the playback of the selected music including, by way of example only, the tempo and pitch of the material or just a link to the location where the material is stored. Of course, those of ordinary skill in the art will recognize that the information discussed previously need not necessarily be physically stored in a single file, but instead pointers might be placed in this file that lead to a disk location where the actual data is stored.

The second preferred section of the data structure that is preferably associated with the encrypted material is the so-called rules section 607. Information that relates to the permitted uses for the musical elements will preferably be stored in this section 607. As has been indicated previously, the artist will preferably specify these rules during the creation of the encrypted material. For example, the artist will be able to define the usage type of the selected musical passage 602, the means by which the data may be distributed 603, the means by which the data may be stored 604 after or during the additional processing, etc. Also the artist will preferably be able to define the circumstances under which the encrypted material may be exported 605. Additionally, the artist will optionally be able to selectively permit access by the consumer to more advanced editing options 606 that are designed to process the selected music passages in a more elaborate fashion. The means by which such rules are created and stored will be described in greater detail in the text that follows.

Figure 7:
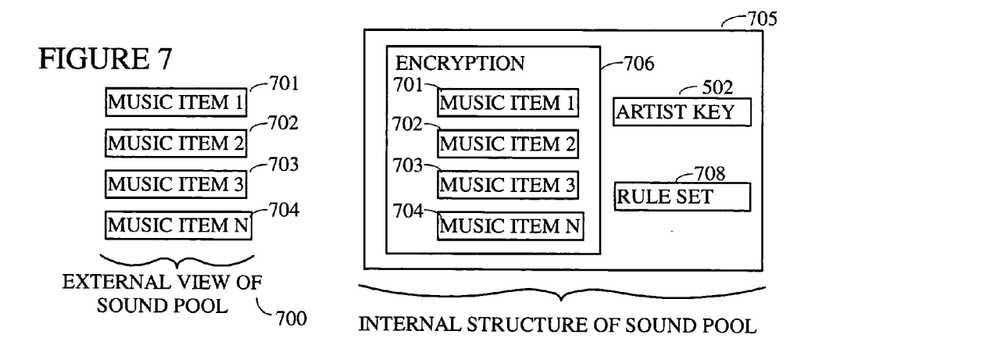
FIG. 7 depicts a comparison between the external and the internal view of the data structure of the created sound pool.

FIG. 7 contains additional details of the operation of the instant invention but with more attention given to the internal processing aspects thereof and its use by an end-user. FIG. 7 features a comparison between the internal view 705 of the sound pool and an external view 700 as it might be presented to the consumer during the editing process. The end-user who wishes to edit or otherwise work with the material in the sound pool (and who is authorized to do so) can choose from the list of available music items (external view 700), wherein the list preferably displays the material in a sequential order from item "1" 701 to item "n" 704, where "n" represents the total number of sound items in the database. Preferably the fact that the sound items are encrypted will be invisible to the user.

The internal view of the sound pool 705 reveals additional details about its structure. Note that encryption is used to ensure that the musical materials 706 are used only in the manner provided for by the artist. Of course, encryption additionally ensures that only legitimate users are able to access the material. The encryption key 502 and the rule set 708 are also preferably embedded into the sound pool 705 along with the audio material. Note that among the sorts of rules that are contemplated for use with the instant invention are a "no-edit" rule (i.e., the user may listen to—but not edit—the encrypted material), a "full edit" rule (i.e., the user may listen to and perform any available editing operation on the encrypted material), a "read-only" rule (i.e., the user may listen to unencrypted material but cannot write it subsequently to disk), a "read/write" rule (i.e., the user may listen to unencrypted material and may write it subsequently to local or remote storage), and a "read/write to disk" rule (i.e., the user may listen to unencrypted material and may write it subsequently to local disk), etc. Further rule examples are suggested in FIG. 12 and those of ordinary skill in the art will be able to devise many others.

Figure 8:
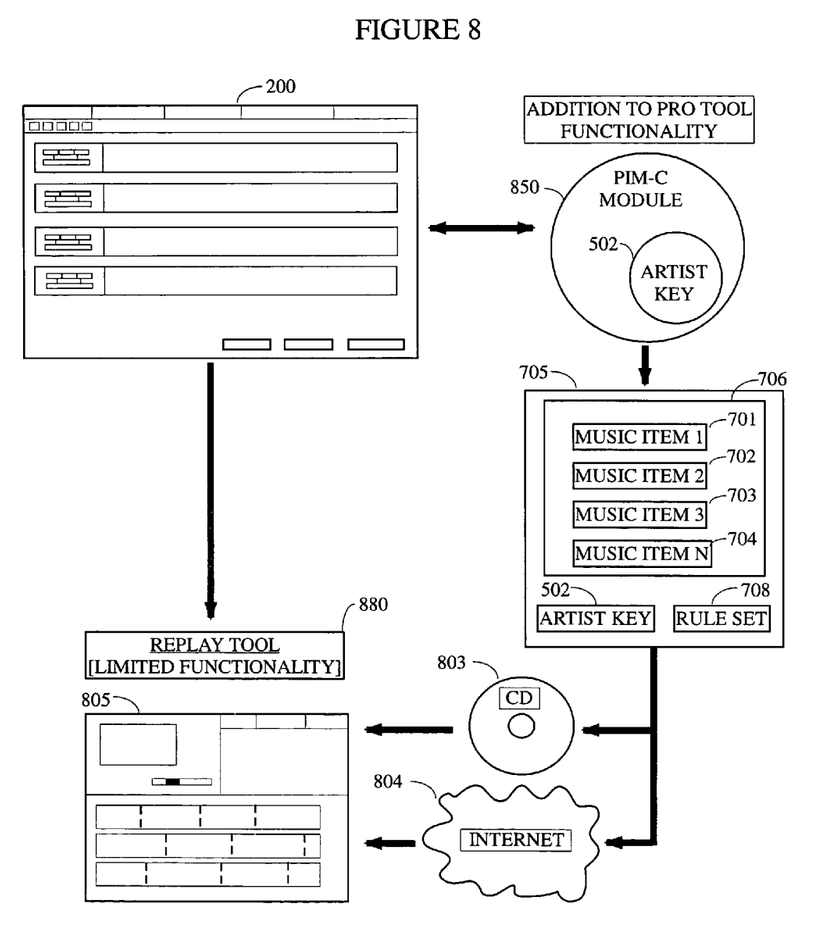
FIG. 8 illustrates the complete workflow of the instant invention with all components.

FIG. 8 illustrates some preferred components of, and a preferred workflow for, one aspect of the instant invention. The components illustrated in this figure include the base music creation system 200, the professional interactive media creation ("PIM-C" hereinafter) module 850 including the encryption key 502, the sound pool 705, the distribution variations (e.g., via CD 803 or Internet 804) and the replay tool 880.

Turning to a description of how the instant invention would operate in practice from the standpoint of the artist, the PIM-C module 850 is preferably designed to be integrated into a base music creation system 200 as an installable module. After the artist has activated this feature, the PIM-C module 850 operates in conjunction with his or her base music creation system 200 to identify and encrypt artist-specified musical items, thereby producing the encrypted sound items 706 as a product, which are preferably stored within sound pool 705.

Additionally, and preferably at the time the music items are selected for encryption, the artist will establish usage rules for each encrypted music item, which rules are preferably stored as part of the sound pool 705. By way of a first example, the artist will be able to choose the method or methods of distribution of the sound pool 705 that are permitted. Among the sorts of distribution methods that are contemplated are distribution via CD 803, over the Internet 804, etc. Depending on the artist's choice, different functions of the PIM-C module 850 will be activated. As a result of these choices, a replay tool 805 with a function set that corresponds to the rules established by the artist will preferably be created.

The replay tool 805 is designed to run on the end-user's computer and perform the functions that have been authorized by the artist. After installation of the replay tool 805 the consumer/end-user will have the opportunity to work with the musical material 706 that has been provided. Additionally, and in another preferred arrangement, the consumer preferably will also be able to upgrade the default (and potentially limited) functionality of the replay tool 805 to an enhanced level of functionality that includes more advanced sound editing options that are not available within the base music creation system.

Figure 9:
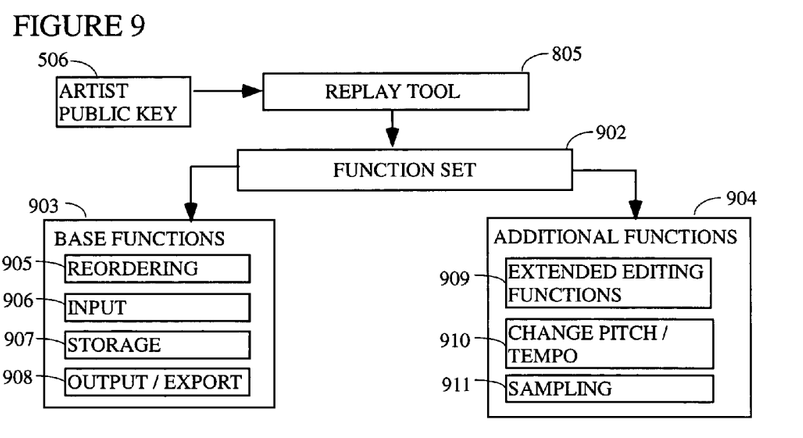
FIG. 9 contains a flowchart which illustrates the different function set that is available for the replay tool of the instant invention.

Turning next to FIG. 9, as is indicated in this figure, the artist key 901 (or, in some embodiments, the public component thereof) is preferably made to be an integral component of the replay tool 805, for without it the stored music items in the sound pool 705 will not be intelligible. Of course, and as a well known alternative, the artist key 901 could also be distributed to the end-user via the Internet (e.g., after payment of an additional amount), via a hardware dongle, "hidden" on the audio CD, etc. As is generally indicated in this figure, the standard function set 902 of the replay tool 805 is preferably divided into base functions 903 and additional functions 904, wherein different functions are selectable initially by the artist. The base functions 904 might include operations such as reordering 905 of the input musical information, an ability to write to non-volatile storage 907, the ability to export 908 data, etc. Preferably, additional functionality 904 will also be provided, depending on the definition by the artist. These might include functions—that are enhanced with respect to the base functions 903 including, for example, extended editing abilities 909 (e.g., cut, paste, duplicate, reverse, etc.), changing the tempo or pitch of the material 910, or sampling 911 sections of the input music data. Of course, those of ordinary skill in the art will recognize that the particular choice of functional operations (and whether or not they are classified as "basic" or "enhanced") is entirely arbitrary and left to discretion of the artist and/or program designer.

Figure 10:
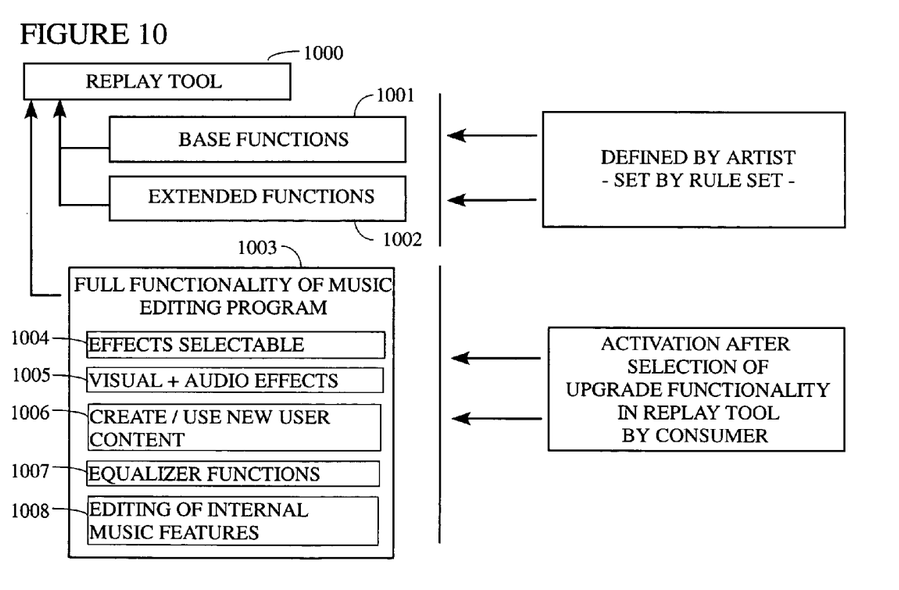
FIG. 10 depicts a flowchart that illustrates the advanced functionality of the replay tool after selection of the upgrade functionality.

FIG. 10 displays the sort of changes in the functionality of the replay tool 1000 that might be observed if the consumer opts to purchase an upgrade. It is to be noted that the standard function set preferably remains active after the upgrade to the full functionality. As those of ordinary skill of the art will readily appreciate, the upgrade functionality is intended to be merely an enhancement of the complete functionality of the replay tool. As has been discussed previously, the standard function set of the replay tool will preferably contain some set of base functions 1001 and extended functions 1002. However, the full functionality of the replay tool is preferably activated only after the consumer selects to upgrade.

In practice, the upgrade process will preferably be performed by having the replay tool read a text and/or numerical pattern from the user. This pattern might consist of numbers or letters and is preferably distributed to the consumer by the instant inventors. This method of upgrading software programs is well known in the software industry and to people with ordinary skill in the art, therefore this process need not be described in more detail here.

Additional functions that might be made available to the consumer after the upgrade step might include an ability to insert and/or apply additional effects 1004, add visual or audio effects 1005, etc. Additionally the consumer might be allowed to create and/or import his or her own digital music content 1006 for use with the content provided or for use in creating a new composition. As another example, the incremental functionality might include a graphic representation of an audio equalizer 1007, with the equalizer settings preferably being applied 1008 to the music currently being edited. Needless to say, the functions that are actually included should not be limited to those discussed above, because those of ordinary skill in the art may readily devise other such functions that might be suitable for use with the instant invention.

Figure 11:
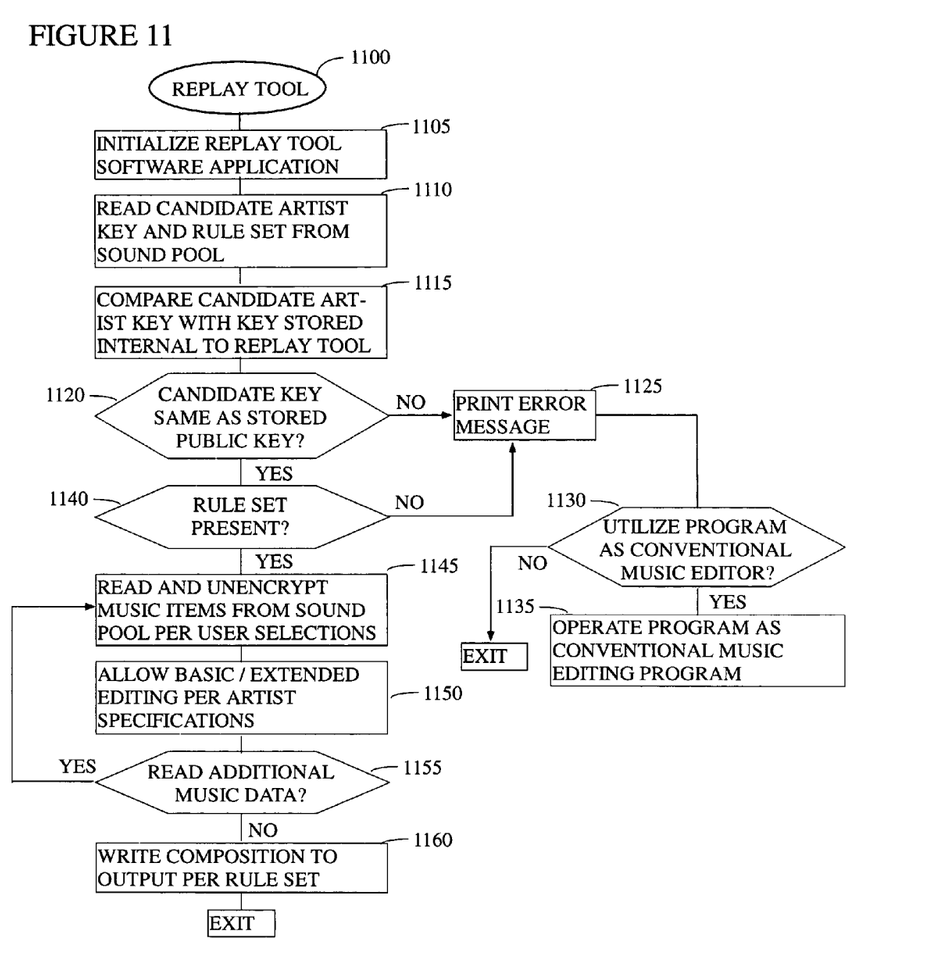
FIG. 11 depicts a flowchart that illustrates the preferred logic of the replay tool as seen by the consumer.

FIG. 11 displays additional information about the order of events and preferred internal program logic 1100 that is experienced when an end-user activates the replay tool 805. As is generally indicated in this figure, as a first step the user will activate the replay tool. As is typically the case with such programs, the program will preferably initialise internal variables in preparation for operation. Additionally, and preferably as part of its initialisation step, the program will open and read at least a portion of the sound pool that the user desires to work with (step 1110). One item of special interest that will preferably be read from the selected sound pool is an artist key (step 1110) or some portion thereof (e.g., the private portion of the artist key). As a next preferred step, this candidate key is compared (step 1115) with the actual artist public key that is preferably stored within the replay tool.

If the two keys do not match, an error message will preferably be printed (step 1125) and the user will typically be given the option (step 1130) to utilize the replay tool as a conventional music editing program (step 1135) without access to the encrypted material. Alternatively, i.e., if the user does not wish to perform conventional editing, the program will typically exit.

On the other hand, if the candidate and embedded keys match a second check will preferably be made for the presence of the rule set (step 1140). If such is not present, the program will preferably follow the branch utilized previously for mismatched or missing keys.

If the key matches and the rule set is present, the program will then preferably enter an event loop (steps 1145, 1150, and 1155) which allows the user to read additional material from the encrypted sound pool and combine such material within the replay tool according to the rule set that has been previously stored within the sound pool. Depending on the permissions within the rule set, the user might also be allowed to import other music items for use with the encrypted music. Preferably, each such imported music item will be flagged as imported. Once the user is satisfied with the composition, or desires to save his or her work at an intermediate point in the editing process, the program will preferably permit the edited work to be stored according to the rule set (step 1160). Preferably, at the next session the user will be able to retrieve the previously stored composition and edit it further.

Figure 12:
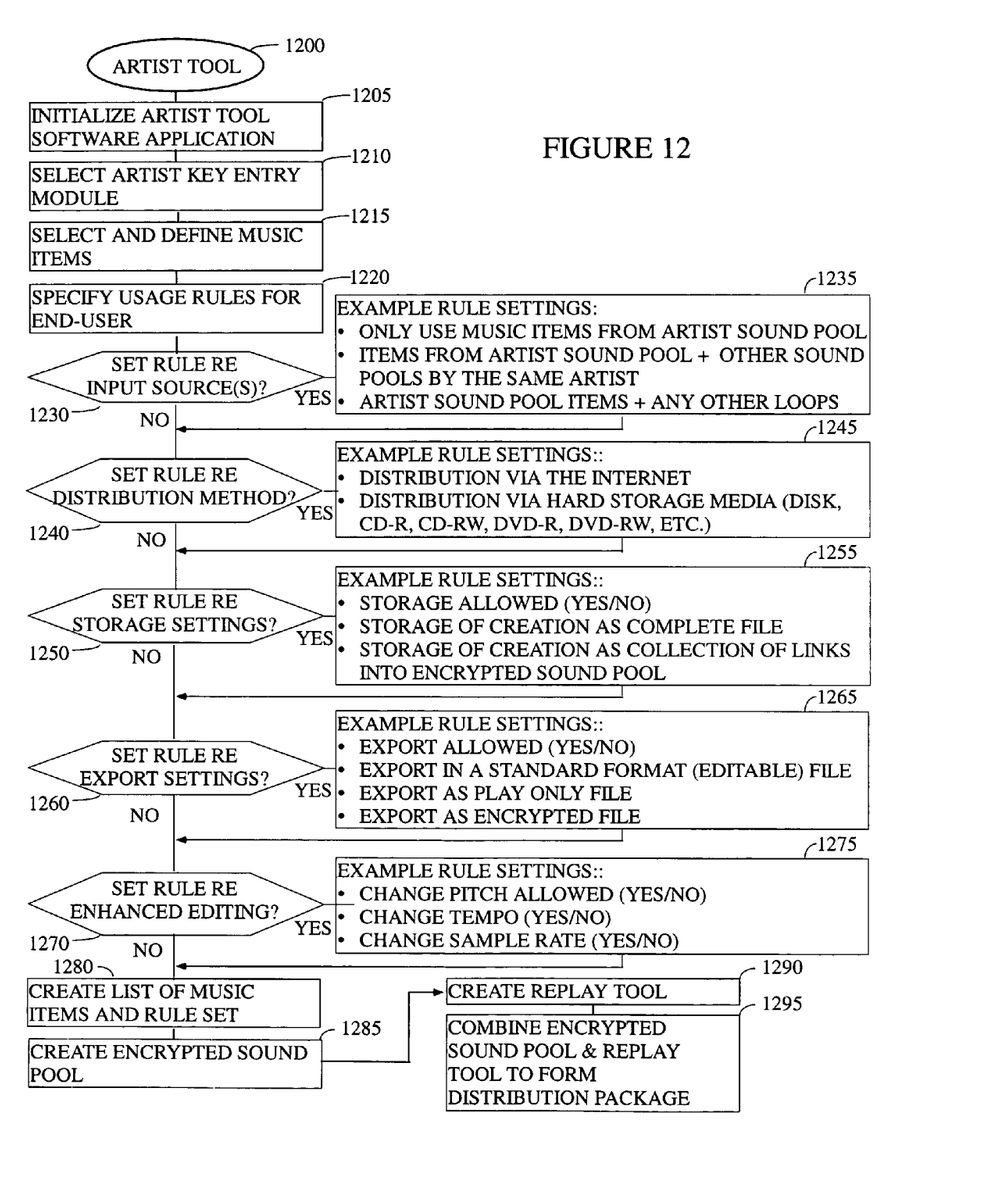
FIG. 12 contains a flowchart that illustrates a preferred operating logic for use by the artist tool.

Finally, FIG. 12 contains an overview of the preferred operating logic of the artist aspect of the instant invention (i.e., the artist tool 1200) and additional information related to the creation of the rules set. As a first preferred step the program will be started and initialized according to methods well known to those of ordinary skill in the art (step 1205). Next, the artist will preferably select the sub-module 1210 that allows him or her to enter the artist key and thereafter also allows him or her to initiate other software options such as selection of material, association of usage rules, etc. It should be clear that the operation of initializing the sub module as described previously will preferably only be performed once per project. As also has been noted previously, the artist will preferably acquire both the artist tool 1200 software and the artist key in one package from a third party.

As a next preferred step the artist will select and define auxiliary music items (e.g., loops, tracks, etc.) 1215 which will preferably be taken from a previously created musical work or that were prepared in conjunction with it (e.g., alternative performance tracks, etc.), the selected materials (including edited versions of same) being those designated for inclusion in the sound pool. The artist will not be limited by the sorts of input materials that he or she chooses to be included in the final product (e.g., the sound pool might contain sounds that were created independently of the subject musical work).

In a next preferred step, the artist will define usage rules for the selected music loops/items (step 1220). These rules will preferably determine how the items in the sound pool can later be used by the consumer. Steps 1230 through 1275 illustrate some preferred rules that might be imposed by the artist. A first rule (steps 1230 and 1235) relates to the input sources that the user is allowed to draw from in creating his or her own composition. As is indicated in the figure (step 1235) and by way of example only, the artist might restrict the user to only creating music works (using the replay tool) that are based on samples provided in the encrypted sound pool. In other instances, the artist might allow the user to import arbitrary loops or tracks or, allow importation of such loops and tracks only if such were in a different sound pool provided by the same artist.

Another rule that might be imposed relates to the distribution of the output from the replay tool (steps 1240 and 1245). By way of example, the user might be allowed to distribute the output from the replay tool only to hard disk and/or the Internet.

In another preferred rule arrangement, rules might be established which control how user's own song creation is stored (steps 1250 and 1255) on hard disk. For example, the artist might prohibit storage of any kind (i.e., only live or real-time performances might be permitted), or storage might be allowed but the user's musical work would consist of pointers into the encrypted database so that the work could not be played without using the replay tool, thereby making it a "play only" file. In still other instances, the artist might permit storage as a standard multi-track digital music file.

As a further example of another rule set, and as is illustrated by steps 1260 and 1265, the artist might elect to limit (or not) the sorts of audio files that might be exported from the program. In one instance, the artist might not allow any export whatsoever, thereby allowing the user to create a musical composition, and to utilize it while the program is running, but not save it. In other variations, the artist might allow encrypted export which would preferably be configured to allow other users who are in possession of the same public key to listen to the musical creation. In still another variation, export might be allowed as a play-only file, or as a standard format fully editable audio file (e.g., files in the WAV, AIF, MP3, etc., format) depending on the wishes of the artist.

In still a further example of the sorts of rules that might be applied, an artist might elect to allow (or not) various sorts of edits to the artist-supplied musical data (steps 1270 and 1275). That is, the replay tool will be configured (or not) to allow the user to change the pitch, change the tempo, resample, filter, or otherwise perform various standard editing and/or signal processing operations on the user's musical composition. Those of ordinary skill in the art will recognize that innumerable edits, filters, effect, etc. might be included or excluded by the instant rule.

As a next preferred step, the artist tool 1280 will assemble the information provided by the artist (i.e., sound clips, rules, etc.) in preparation for creating an encrypted sound pool (step 1285) and a customized replay tool (step 1290) according to methods discussed previously. Finally, and as a preferred last step, the encrypted sound pool and replay tool will be combined (e.g., by writing to the same CD-R disk) or otherwise associated for delivery to the end user (step 1295).

CONCLUSIONS

Of course, many modifications and extensions could be made to the instant invention by those of ordinary skill in the art. For example in one preferred embodiment the material provided by the artist within the sound pool will not be limited to music, but will also include videos, digital photos, etc. Thus, for purposes of the instant invention when the term "sound pool" is used herein, that term should be construed in its broadest sense to include files and databases that are for the storage of encrypted media files and, optionally, usage rules.

Note that it is an important aspect of the instant invention that the disk that results from application of the methods taught herein must be playable on a conventional CD, DVD, etc., player. That is, the music component that is written to a storage medium such as CD, a CD-R, a CD-RW, a DVD, a DVD-R, a DVD-RW, or to some other sort of storage medium (e.g., non-volatile RAM, PROM, EPROM, flash RAM, hard disk, etc.), must be written according to industry standards so that it can be played on a conventional CD or DVD player, etc. For purposes of the instant application, the term media-player will be broadly defined to include any industry standard (conventional) CD player, DVD player, computer (e.g., where the music is stored in flash RAM as MP3 or WAV files), etc., that can be used to read and play the unencrypted information on the disk. Thus, and by way of summary, in one preferred embodiment each such disk is partitioned into at least two different regions: one of which contains conventional audio data and another of which contains encrypted music items, usage rules, technical data, etc. It should be noted that the word "partition" should not be interpreted in the limited sense of a conventional "disk partition", but instead should be more broadly understood to mean any sort of division (logical or physical) of the disk into two or more regions, at least one of which contains conventionally written audio data. Note that in other preferred embodiments, the music may be distributed on one disk and the encrypted material on another disk.

Finally, it should also be mentioned that in some instances it will be possible to use a standardized replay tool, rather than building each one according to selections of the artist. One instance where this might be particularly useful is where the artist wishes to permit "all" functions. In such a case, a standardized reply tool that is pre-coded to permit all possible functionality could certainly be created and reused with each artist that requests same, as many artists will likely do.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those skilled in the art, without departing from the spirit of the inventive concept the scope of which is to be determined by the following claims.

What is claimed is:

1. A method of creating a secure multimedia data product, wherein is provided at least one musical work, and at least one auxiliary sound item for use therewith, comprising the steps of:
   (a) selecting an encryption key;
   (b) encrypting said at least one auxiliary sound item according to said encryption key;
   (c) writing said at least one musical work to a first storage medium according to an industry standard format;
   (d) writing said encrypted at least one auxiliary sound item to a second storage medium;
   (e) writing a rule set to a third storage medium;
   (f) distributing said at least one musical work and said encrypted at least one auxiliary sound item to an end-user;
   (g) providing at least a portion of said encryption key to said end-user;
   (h) providing a replay tool to said end-user, said replay tool being at least for reading said at least one auxiliary sound item, unencrypting said at least one auxiliary sound item, and interacting therewith according to said rule set;
   (i) using said replay tool and said provided at least a portion of said encryption key to unencrypt at least one of said encrypted auxiliary sound items; and,
   (j) interacting said at least one un-encrypted auxiliary sound items with at least one of said at least one musical work within said replay tool according to said rule set, thereby creating a modified performance of said at least one musical work.

2. The method according to claim 1, wherein said first storage medium, said second storage medium, and said third storage medium are selected from a group consisting of a CD disk, a CD-R disk, a CD-RW disk, a DVD disk, a DVD-R disk, a DVD-RW disk, a hard disk, and a flash RAM module.

3. The method according to claim 1, wherein step (j) comprises the step of editing at least one of said un-encrypted sound items within said replay tool according to said rule set.

4. The method according to claim 1, wherein said first storage medium, said second storage medium and said third storage medium are a same storage medium.

5. The method according to claim 1, wherein step (f) comprises the step of:
   (f1) distributing said first storage medium, said second storage medium, and said third storage medium to an end-user.

6. The method according to claim 1, wherein said rule set includes at least one rule selected from the group consisting of a no-edit rule, a full-edit rule, a read-only rule, a read/write rule, and a read/write-to-disk rule.

7. The method according to claim 1, wherein said encryption key comprises a private key and a public key, and wherein step (g) comprises the steps of:
(g1) storing said private key together with said encrypted at least one auxiliary sound items, thereby providing at least a portion of said encryption key to the end-user.

8. The method according to claim 1, wherein said encryption key comprises a public key and a private key, and wherein step (g) comprises the step of providing said public key to said end-user.

9. The method according to claim 1, wherein at least one of said at least one auxiliary sound items is selected from a group consisting of an alternative performance track of one of said at least one musical works, a remixed version of one of said at least one musical works, and a loop sampled from one of said at least one musical works.

10. The method according to claim 1, wherein said encrypted at least one auxiliary sound items are stored in a sound pool.

11. A method of creating a secure multimedia data product, wherein is provided at least one musical work, and at least one sound item for use therewith, said at least one sound item being compatible for use with at least one of said at least one musical work, comprising the steps of:
(a) selecting a first encryption key;
(b) selecting a second encryption key;
(c) encrypting said at least one sound item according to said first encryption key and said second encryption key;
(d) writing said at least one musical work to a storage medium according to an industry standard;
(e) writing said encrypted at least one sound item to said storage medium;
(f) writing said first encryption key to said storage medium along with said encrypted at least one sound item;
(g) formulating at least one rule,
wherein said formulated at least one rule specifies a type of usage of said encrypted at least one sound item with respect to said at least one of said at least one musical work, and,
wherein said formulated at least one rule comprises a rule set;
(h) writing said rule set to said storage medium; and,
(i) writing a replay tool to said storage medium, thereby creating a secure multimedia product.

12. The method of creating a secure multimedia data product according to claim 11, further comprising the steps of:
(j) distributing said storage medium to an end-user;
(k) providing said second encryption key to said end-user;
(l) using said replay tool and said first and second encryption keys to un-encrypt at least one of said encrypted sound items; and,
(m) interacting with said at least one unencrypted sound item within said replay tool according to said rule set.

13. The method according to claim 11, wherein said storage medium is selected from a group consisting of a CD disk, a CD-R disk, a CD-RW disk, a DVD disk, a DVD-R disk, a DVD-RW disk, a hard disk, and a flash RAM module.

14. The method according to claim 11, wherein said storage medium comprises a plurality of CD disks.

15. A method of utilizing a secure multimedia data product, wherein is provided at least one musical work, and at least one sound item for use therewith, comprising the steps of:

(a) selecting an encryption key;
(b) encrypting said at least one sound item according to said encryption key;
(c) writing said at least one musical work to a storage medium according to an industry standard;
(d) writing said encrypted at least one sound item to said storage medium;
(e) writing a rule set to said storage medium, wherein said rule set contains at least one usage rule;
(f) distributing said storage medium to an end-user;
(g) providing said encryption key to said end-user;
(h) using said replay tool and said encryption key to un-encrypt at least one of said encrypted sound items;
(i) reading at least one of said at least one usage rules; and,
(j) using said replay tool to interact said at least one of said at least one unencrypted sound items with at least one of said at least one musical work according to at least one of said read at least one usage rule.

16. The method according to claim 15, wherein said storage medium is selected from a group consisting of a CD disk, a CD-R disk, a CD-RW disk, a DVD disk, a DVD-R disk, a DVD-RW disk, a hard disk, and a flash RAM module.

17. The method according to claim 15, wherein said storage medium comprises a plurality of CD disks.

18. A method of controlling access to a multimedia data product, wherein is provided at least one musical work, at least one auxiliary sound item for use therewith, and a replay tool, comprising the steps of:
(a) writing said at least one musical work to a first storage medium according to an industry standard;
(b) writing said at least one auxiliary sound item to a second storage medium;
(c) creating a rule set for use with said at least one auxiliary sound item, said rule set containing at least one usage rule therein;
(d) writing said rule set to a third storage medium;
(e) distributing said at least one musical work, said rule set, and said at least one auxiliary sound item to an end-user;
(f) reading at least one of said usage rules within said rule set;
(g) using said replay tool to read at least one of said stored auxiliary sound items;
(h) reading at least a portion of one of said at least one musical work from said first storage medium; and,
(i) interacting with said at least one read auxiliary sound items and with said read portion of said at least one musical work within said replay tool according to said read at least one usage rule, thereby creating a modified performance of said read portion of said at least one musical work.

19. The method according to claim 18, wherein said first, said second, and said third storage media are a same type of storage media.

20. The method according to claim 19, wherein said same type of storage media is selected from a group consisting of a CD disk, a CD-R disk, a CD-RW disk, a DVD disk, a DVD-R disk, a DVD-RW disk, a hard disk, and a flash RAM module.

21. The method according to claim 18, wherein step (e) comprises the step of:
(e1) distributing said first, said second, and said third storage media to an end-user.

22. The method according to claim 18, wherein step (b) comprises the steps of:
(b1) selecting an encryption key;
(b2) encrypting said at least one one sound item according to said encryption key, thereby producing at least one one encrypted sound item;

(b3) writing said at least one encrypted sound item to a second storage medium; and, wherein, step (f) comprises the steps of:
(f1) providing said encryption key to the end-user,
(f2) using said replay tool to read at least one of said encrypted sound items,
(f3) using said replay tool and said encryption key to unencrypt at least one of said encrypted sound items, thereby recovering said at least one of said written sound items.

* * * * *